US007268608B2

(12) United States Patent
Zou

(10) Patent No.: US 7,268,608 B2
(45) Date of Patent: Sep. 11, 2007

(54) WIDEBAND SQUARING CELL

(75) Inventor: Min Z. Zou, Milpitas, CA (US)

(73) Assignee: Linear Technology Corporation, Milpitas, CA (US)

( * ) Notice: Subject to any disclaimer, the term of this patent is extended or adjusted under 35 U.S.C. 154(b) by 27 days.

(21) Appl. No.: 11/206,070

(22) Filed: Aug. 18, 2005

(65) Prior Publication Data

US 2007/0040598 A1 Feb. 22, 2007

(51) Int. Cl.
*G06F 7/556* (2006.01)

(52) U.S. Cl. ........................................ 327/349; 327/346

(58) Field of Classification Search ................ 327/346, 327/349, 359

See application file for complete search history.

(56) References Cited

U.S. PATENT DOCUMENTS 5,077,541 A 12/1991 Gilbert
5,432,478 A 7/1995 Gilbert
5,481,224 A * 1/1996 Kimura ...................... 330/253
5,485,119 A * 1/1996 Kimura ...................... 330/253
5,684,431 A 11/1997 Gilbert et al.
6,172,549 B1 1/2001 Gilbert
6,204,719 B1 3/2001 Gilbert
6,348,829 B1 2/2002 Gilbert
6,429,720 B1 8/2002 Gilbert
6,437,630 B1 8/2002 Gilbert
6,489,849 B1 12/2002 Gilbert
6,525,601 B2 2/2003 Gilbert
6,861,890 B2 3/2005 Gilbert

OTHER PUBLICATIONS

AD8367: 500MHz, Linear-in-dB VGA with AGC Detector, 2001.
AD8362: 50HZ to 2.7 GHz 60dB TruPwr Detector, 2004.
AD8361: LF to 2.5GHz TruPwr Detector, 2004.

* cited by examiner

*Primary Examiner*—Kenneth B. Wells
(74) *Attorney, Agent, or Firm*—McDermott Will & Emery LLP

(57) ABSTRACT

A squaring cell comprises a first circuit responsive to an input voltage to produce a corresponding current, and a second circuit, preferably in the form of an absolute modulator circuit, responsive to the current produced by the first circuit and to the input voltage to produce an output current that corresponds to the square of the input voltage. In one embodiment, the first circuit comprises an absolute value voltage-to-current converter; in another, the first circuit comprises a linear voltage-to-current converter. Techniques to improve accurate square law performance of the cell, independent of temperature, and of broad input voltage range and frequency, are presented.

34 Claims, 5 Drawing Sheets

WIDEBAND SQUARING CELL

TECHNICAL FIELD

The disclosure is directed to a novel circuit architecture for producing an output signal corresponding accurately to the square of an input signal.

BACKGROUND INFORMATION

Circuitry for squaring an input signal has a number of practical applications, among which are included logarithmic amplifiers and RMS-DC converters implementing them. Such amplifiers often are applied to systems for measuring the power of an RF signal. Doing so capably requires an amplifier exhibiting true square law conformability over a broad dynamic range and being relatively independent of temperature. The subject matter presented herein presents novel circuitry for achieving these characteristics.

SUMMARY OF DISCLOSURE

Presented herein is a squaring cell which comprises a first circuit responsive to an input voltage to produce a corresponding current, and a second circuit responsive to the current produced by the first circuit and to the input voltage to produce an output current that corresponds to the square of the input voltage. The second circuit may comprise an absolute value modulator circuit, and the first circuit may comprise an absolute value, or alternatively, linear, voltage-to-current converter. The circuitry advantageously is composed of bipolar transistors in differential pair configuration, in which tail current is proportional to the square of absolute temperature. Resistors may be implemented to achieve a high effective transistor area ratio while maintaining reasonable transistor size for high frequency operation, and to precisely achieve an accurate square law characteristic.

DETAILED DESCRIPTION

Figure 1:
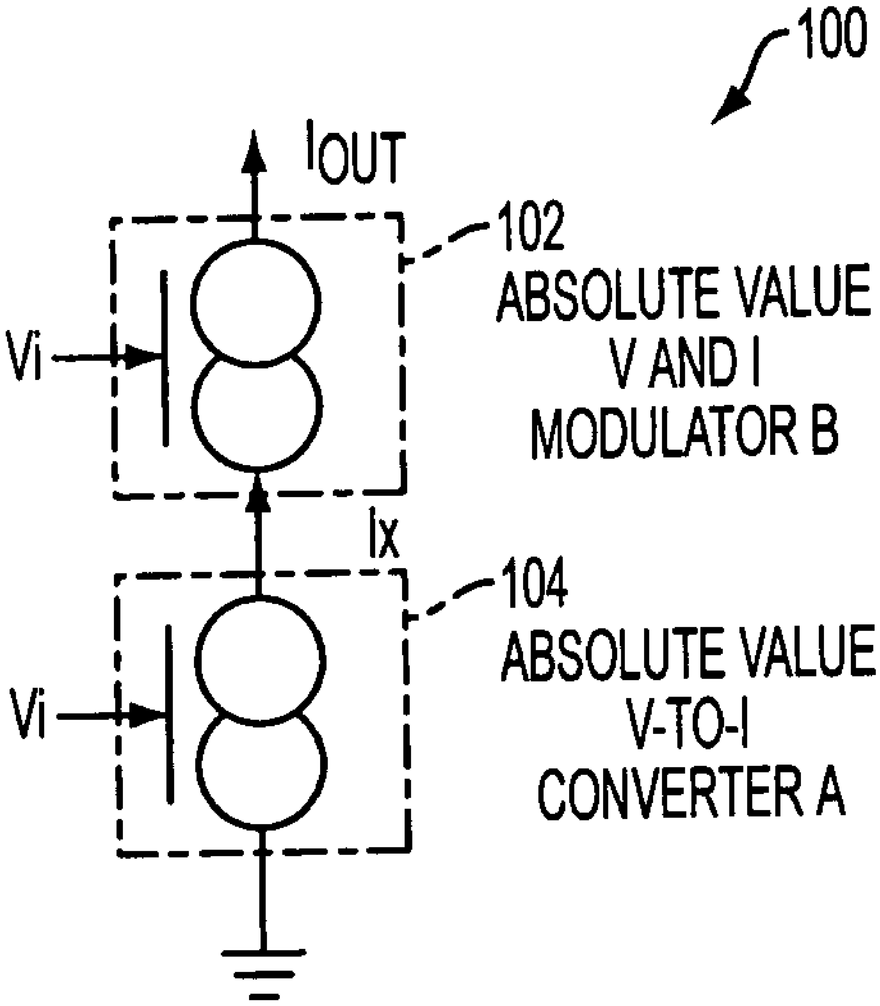
FIG. 1 is a simplified diagram showing squaring cell implementation, in accord with one embodiment of the disclosure.

In accord with the principles presented herein, a novel squaring circuit or cell is implemented by a circuit 100, one embodiment of which is presented functionally in FIG. 1, in which the voltage input signal to be squared is applied to voltage inputs of an absolute value voltage and current modulator 102 and of an absolute value voltage-to-current converter 104. The converter 104 applies a current proportional to the input voltage to a current input of the modulator 102. In response to the applied voltage and current inputs, the modulator produces an output current that is proportional to the square of the input voltage.

As will be described, modulator 102 and converter 104 are implemented using bipolar transistors, which inherently present an exponential transconductance characteristic in response to small magnitude input signals of a prescribed polarity depending on the conductivity type of the transistor. In the examples to be described, the transistors are npn type, base driven to an active region in response to an applied positive voltage greater than the transistor's thermal voltage (about 23 mv.). The circuitry described herein, of course, may be implemented with transistors of either gender. Modulator 102 is configured to be responsive to bipolar input voltage and current signals in such a manner as to generate an output current that is a function of the absolute value of the input voltage to produce the desired squaring signal.

Referring now to FIG. 1 in more detail, input voltage Vin is applied commonly to voltage input nodes of modulator 102 and converter 104. Converter 104 supplies its output current Ix, which is proportional to |Vin|, to an input current node of modulator 102 as depicted. Modulator 102 is responsive to both the absolute value of input voltage and input current applied to it to produce an output current Iout that corresponds to the square of the input voltage.

This operation can be quantified by the following equations:

$$Ix=a*|\mathrm{Vin}| \tag{1}$$

where a is the coefficient of V-to-I converter 104, and $$I\mathrm{out}=b*|\mathrm{Vin}|*Ix \tag{2}$$

where b is the coefficient of voltage and current modulator 102. Combining Equation 1 and Equation 2, Iout can be rewritten as follows:

$$I\mathrm{out}=a*b*|\mathrm{Vin}|*Ix=c*\mathrm{Vin}^2 \tag{3}$$

Hence, the output current produced by modulator 102 is proportional to the square of the input voltage.

Figure 2:
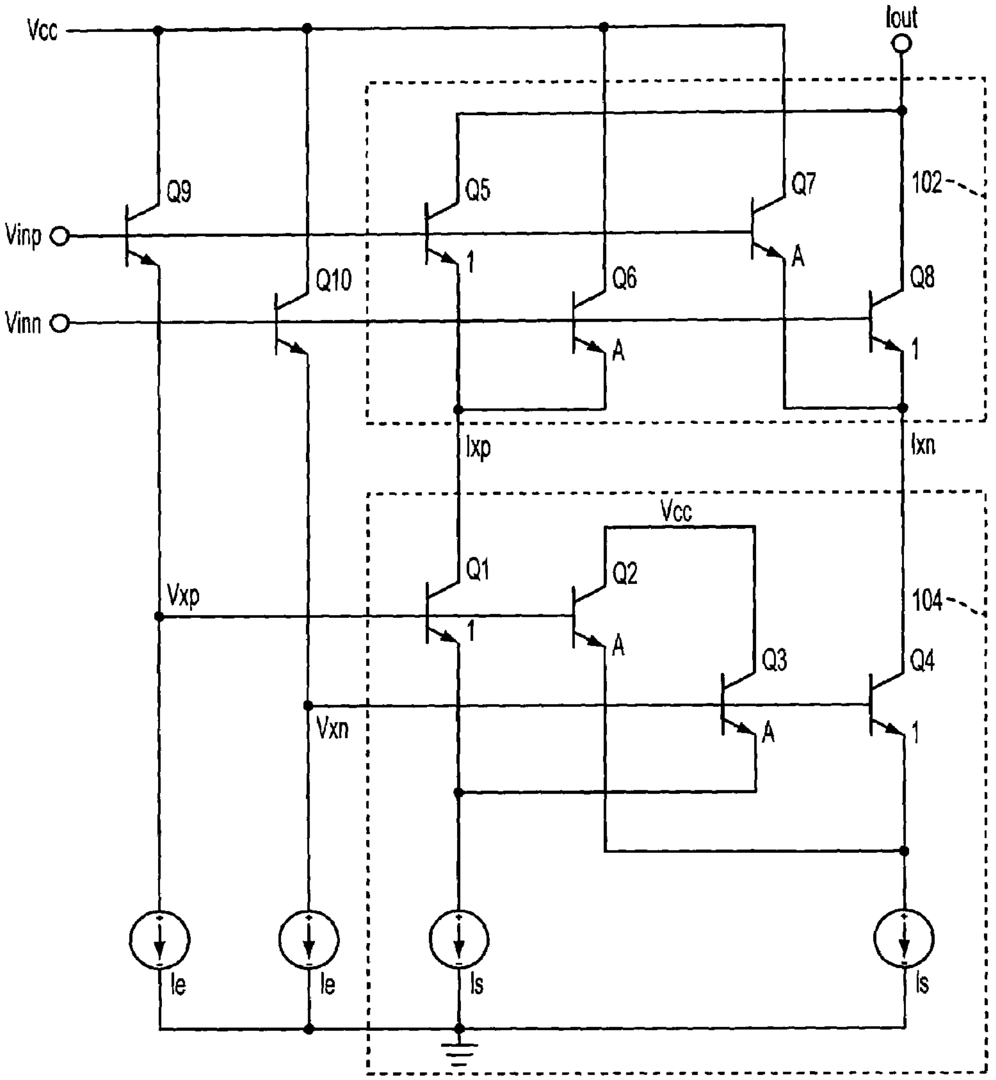
FIG. 2 shows a more detailed circuit diagram corresponding to FIG. 1.

The principles of this disclosure may be better understood upon consideration of an exemplary circuit implementation of the FIG. 1 architecture, presented in FIG. 2. Referring to FIG. 2, converter 104 comprises bipolar transistors Q1-Q4, interconnected as shown, with the base electrodes of transistors Q1 and Q2 commonly receiving the positive-going component Vxp buffered from input voltage signal Vinp through an emitter follower Q9. Transistor Q9, which is connected between the positive and negative rails, has an emitter constant current source Ie. The emitters of transistors Q1 and Q3 are connected commonly through a constant current source Is to the ground rail. The collector of transistor Q1 is connected to supply output current component Ixp to modulator 102.

Similarly, the base electrodes of transistors Q3 and Q4 commonly receive the negative-going component Vxn buffered from input voltage signal Vinn through emitter-follower transistor Q10. Transistor Q10 is connected between the rails and another emitter constant current source Ie. The voltages Vxn and Vxp, applied to converter 104 are equal in magnitude to those of the input voltages Vinn and Vinp, reduced by the DC level shifter by transistors Q9 and Q10.

The emitters of transistors Q2 and Q4 are connected commonly to the negative rail through constant current source Is. The collectors of transistors Q2 and Q3 are connected commonly to the positive rail. The collectors of transistor Q1 and Q4 are connected to supply output current components Ixp and Ixn respectively to modulator 102. These current components are proportional to the magnitudes of input voltages Vinp and Vinn together with quiescent DC current supplied by transistors Q2 and Q3. Current through the two sources Is is shared by transistors Q1, Q2 and Q3, Q4, respectively.

Modulator 102 comprises transistors Q5-Q8, interconnected as shown. Transistors Q5 and Q6 have emitters connected commonly to node Ixp, and collectors connected to the Iout node and positive rail, respectively. Transistors Q7 and Q8 correspondingly have emitters connected commonly to node Ixn and collectors connected to the positive rail and Iout node, respectively. The modulator 102 receives the positive and negative components Vinp, Vinn of the input voltage at the bases of transistors Q5, Q7 and Q6, A8. Current Ixp conducted by transistor Q1 is shared through transistors Q5 and Q6 in proportion to the size ratio of those transistors. Correspondingly, current Ixn, conducted by transistor Q4 of converter 104 is shared through transistors Q7 and Q8 proportionally according to transistor ratio. The collectors of Q5 and Q8 are interconnected at output node Iout. The significance of this 1:A size ratio among transistors Q1-Q8 in FIG. 2 will now be explained.

By the "size" of a transistor is meant the effective emitter area of that transistor. The significance of transistor size can be appreciated by a recognition that each transistor of a like pair of transistors receiving the same bias conditions will conduct a current proportional to its size. That is, one transistor of a pair whose size (emitter area) is twice that of the other transistor of the pair will conduct twice the current, assuming the same biasing.

Considering the circuit of FIG. 2, transistors Q1, Q4, Q5 and Q8 are shown to be normalized arithmetically to have a size of unity; transistors Q2, Q3, Q6 and Q7 are sized to be of ratio A (where A is a ratio greater than unity). Transistors Q2, Q3, Q6 and Q7 will conduct more current than transistors Q1, Q4, Q5 and Q8 by ratio A, when commonly biased.

The following equations describing the circuit of FIG. 2 can now be written, where Is is transistor saturation current, Vt is transistor thermal voltage, A is transistor ratio as explained, and Vxp, Vxn, Vinp and Vinn are as presented in the circuit diagram:

$$Ixp - Iss * \frac{1}{1 + A * e^{(Vxp-Vxn)/Vt}} = Iss * \frac{1}{1 + A * e^{(Vinp-Vinn)/Vt}}; \tag{4}$$

$$Ixn = Iss * \frac{1}{1 + A * e^{-(Vxp-Vxn)/Vt}} = Iss * \frac{1}{1 + A * e^{-(Vinp-Vinn)/Vt}}; \tag{5}$$

Ix in FIG. 1 can be considered to be the sum of Ixp and Ixn in FIG. 2, so that:

$$Ix = Ixp + Ixn == Iss\left(\frac{1}{1 + A * e^{(Vinp-Vinn)/Vt}} + \frac{1}{1 + A * e^{-(Vinp-Vinn)/Vt}}\right) \tag{6}$$

which can be transformed to show that Ix≈small dc quiescent current+a*|Vin|

When Vin>0 (Vin=Vinp−Vinn=Vxp−Vxn), transistor Q5 starts to conduct current. The modulator 102 generates an output current through transistor Q5, proportional to the input voltage Vin, and very little current through transistor Q8. When Vin<0 (Vin=Vinp−Vinn=Vxp−Vxn), transistor Q8 starts to conduct current. The modulator 102 now generates output current through transistor Q8, proportional to the input voltage Vin and very little through transistor Q5. This sharing of output current varies continuously in dependence upon the polarity and magnitude of the input voltage.

Transistors Q5 and Q7 are operative in a manner complimentary to Q5 and Q8 so as to supply Ixp and Ixn, respectively. Transistors Q6 and Q7, being of ratio A, conduct more current than transistors Q5 and Q8. The sum of the controlled collector currents of transistors Q5 and Q8, supplied by the output of voltage-to-current converter 104, forms the output current of the modulator 102. This output corresponds to the square of the input voltage Vin. Similarly, with respect to converter 104, transistors Q2 and Q3, which are connected to be complimentary to transistors Q1, Q4, and being of transistor ratio A, supply the quiescent current. The foregoing can be quantified as follows:

$$\begin{aligned} Ic5 &= Ixp * \frac{1}{1 + A * e^{(Vinp-Vinn)/Vt}} \\ &= Is * \frac{1}{1 + A * e^{(Vxp-Vxn)/Vt}} * \frac{1}{1 + A * e^{(Vinp-Vinn)/Vt}} \\ &= Is * \left\{\frac{1}{1 + A * e^{(Vinp-Vinn)/Vt}}\right\}^2; \end{aligned} \tag{7}$$

$$\begin{aligned} Ic8 &= Ixn * \frac{1}{1 + A * e^{-(Vinp-Vinn)/Vt}} \\ &= Is * \left\{\frac{1}{1 + A * e^{-(Vinp - Vinn)/Vt}}\right\}^2; \end{aligned} \tag{8}$$

$$\begin{aligned} Iout &= Ic5 + Ic8 \\ &= Is * \left\{\frac{1}{1 + A * e^{(Vinp-Vinn)/Vt}}\right\}^2 + \\ &= Is * \left\{\frac{1}{1 + A * e^{-(Vinp-Vinn)/Vt}}\right\}^2 \end{aligned} \tag{9}$$

In the circuit implementation of FIG. 2 both voltage-to-current converter 104 and voltage and current modulator 102 as described are absolute value circuits. The output current Iout is seen to conform precisely to the square law relationship described in equation (3), that is, Iout fits x well when x<1. In other words, Iout is linearly proportional to the square of the input voltage up to Vt.

Figure 3:
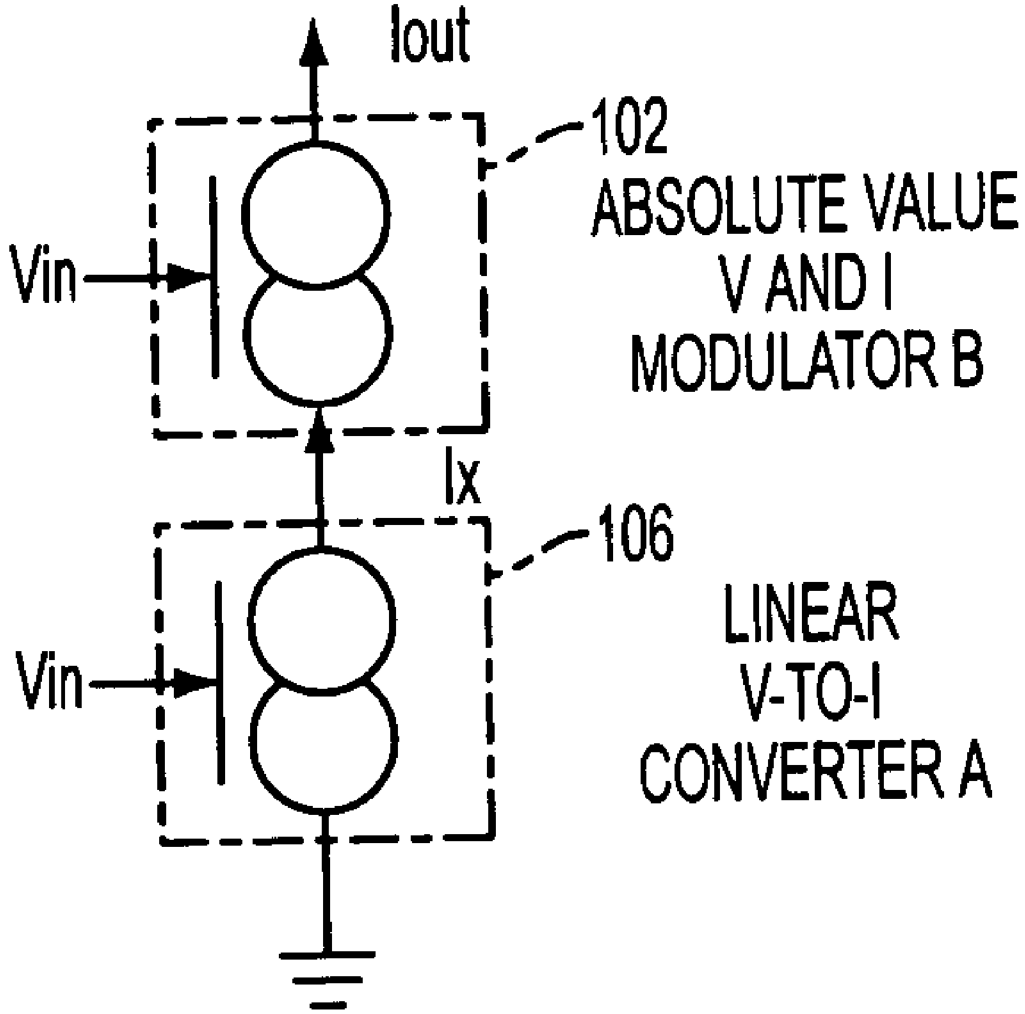
FIG. 3 is a simplified diagram showing square cell implementation, in accord with one embodiment of the disclosure.
Figure 4:
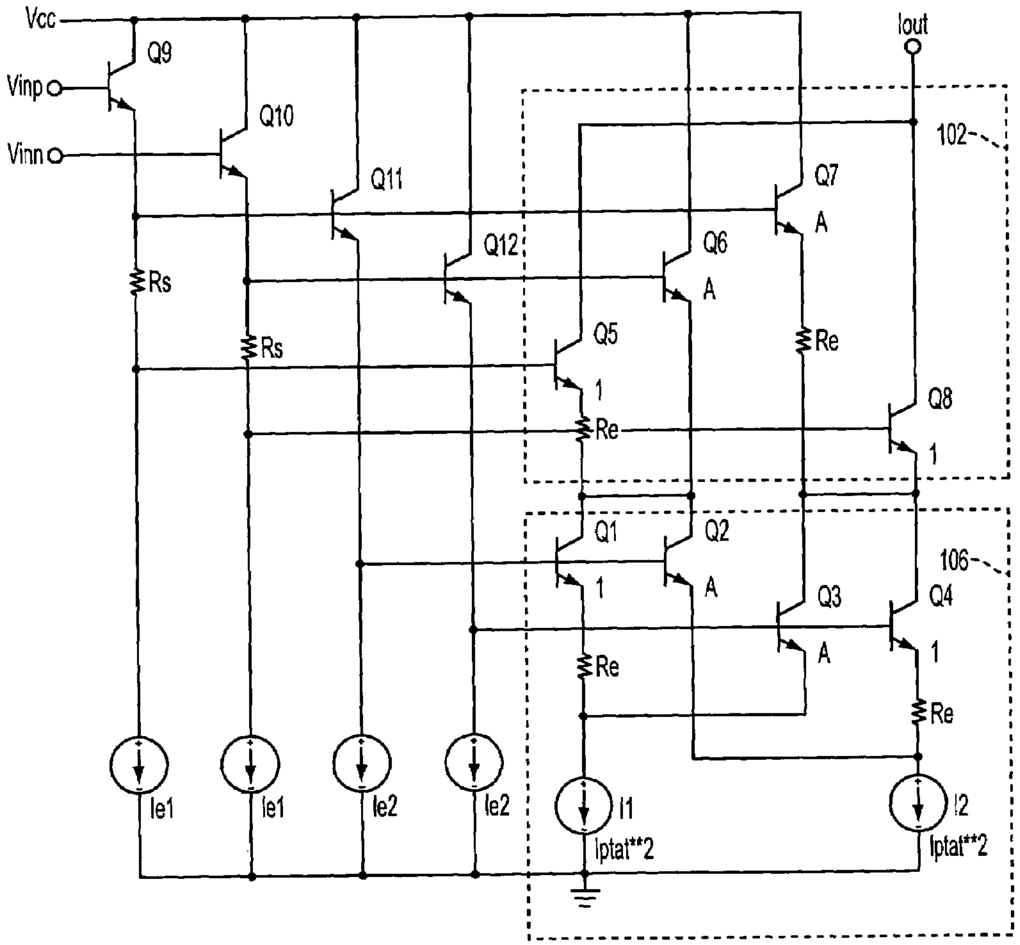
FIG. 4 shows a more detailed circuit diagram corresponding to FIG. 3.

A second embodiment in which absolute value V-to-I converter 104 is replaced by a linear V-to-I converter 106 is depicted in FIG. 3, and a circuit implementation shown in FIG. 4. Transistors Q5-Q8 of absolute voltage and current modulator 102 are configured to operate similarly to the configuration shown in FIG. 2, and description will not be repeated. Linear voltage-to-current converter 106 comprises transistors Q1-Q4, interconnected as shown. The bases of transistors Q1 and Q2 are connected commonly to receive Vinp through emitter followers Q9 and Q11. The bases of transistors Q3 and Q4 are connected commonly to receive Vinn through emitter followers Q10 and Q12. The emitters of transistors Q1 and Q3 are connected commonly to a current source proportional to the square of absolute temperature Iptat2 which passes current proportional to square of absolute temperature. The emitters of transistors Q2 and Q4 are connected commonly to a like current source Iptat2. Emitter followers Q11 and Q12 are connected between the positive and negative rails, the emitter circuit of each having a constant current source Ie2. Emitter followers Q9 and Q10 are configured similarly, the emitter circuit of each having a resistor Rs and a constant current source Ie1. Current sources Ie1 and Ie2 in the emitter circuits of followers Q11 and Q12, respectively, are zero temperature coefficient current sources. Tail currents I1 and I2 are proportional to the square of absolute temperature. Tail currents produced as described are necessary to cause the output current of the multiplier to be independent of temperature. Resistors Re are in the emitter circuits of transistors Q1, Q4, Q5 and Q7. The functions of resistors Re and Rs will be explained hereinafter.

The collectors of transistors Q2 and Q3 may be joined to Ixp and Ixn, respectively. As a result, the output current will be doubled for a given Vin. However, this would result in a quiescent current Iq as a component of Ixp and Ixn.

The foregoing can better understood from the following mathematical description $$Ixp=2a*\text{Vin}+Iq;\text{ and} \tag{11}$$

$$Ixn=-2a*\text{Vin}+Iq; \tag{12}$$

where a is the coefficient of the V-to-I converter.

$$Ic5=b*\text{Vin}*Ixp\text{ if Vin}>0 \tag{13}$$

$$Ic8=-b*\text{Vin}*Ixn\text{ if Vin}<0 \tag{14}$$

By combination of (11) and (12):

$$I\text{out}=Ic5+Ic8=4*a*b*V_{in}^2=4*c*V_{in}^2 \tag{15}$$

To conform to the square law relationship over a wide range of input signal magnitudes in FIG. 4, the collectors of transistors Q2 and Q3 are connected to the emitters of transistor pairs Q5, Q6 and Q8, Q3, respectively. A resistor Re is applied to each of the emitter circuits of transistors Q1, Q4, Q5 and Q7, sized to fit square law operation of the circuit more precisely To minimize DC quiescent current and conform to the square law relationship, a high transistor ratio A is desirable. However, this may result in degraded high frequency performance. Accordingly, resistor Rs is added in the emitter circuits of Q9 and Q10 to achieve a desirable transistor effective area ratio while maintaining reasonable size A for high frequency operation. This may be better understood from the following.

In general, for a transistor of size A:

$$Vbe=Vt*ln(Ic/A*Is), \tag{16}$$

where Is is saturation current. This expression can be rewritten as:

$$Vt*\ln(Ic/Is)-Vt*ln(A). \tag{17}$$

The second term is an offset voltage proportional to Vt. Thus, a transistor having an emitter resistor Rs, implemented as shown, is equivalent to a transistor of unity size (normalized) plus an offset voltage which can be introduced by the product of offset current and Rs. The constant current sources Ie1 and Ie2 in the emitter circuits of transistors Q9 and Q10 are zero temperature coefficient current sources to cause the DC offset to be independent of temperature. This will partially compensate the output conformance to square law verses temperature for a relatively large input voltage.

Figure 5A:
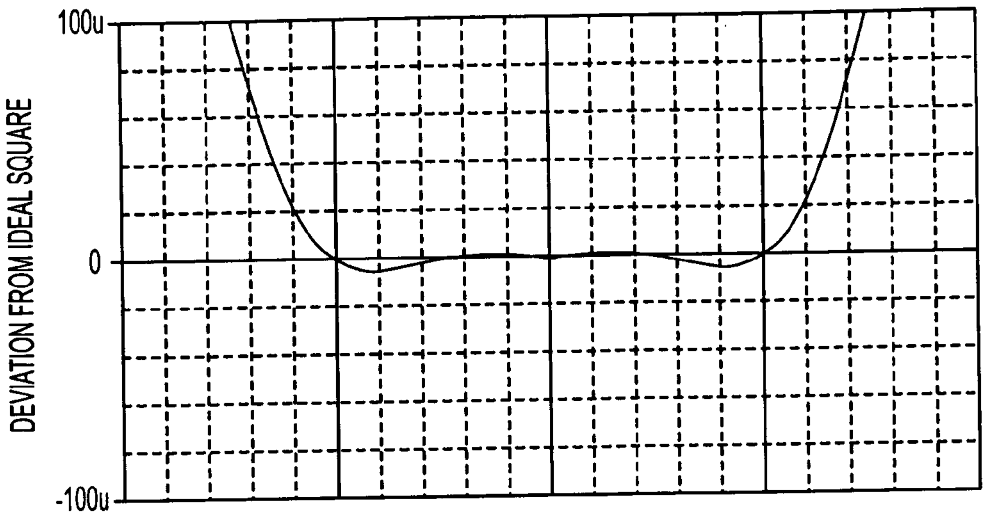
FIGS. 5(*a*) and 5(*b*) are charts representing characteristics of output signals from the squaring cell, obtained by simulation.
Figure 5B:
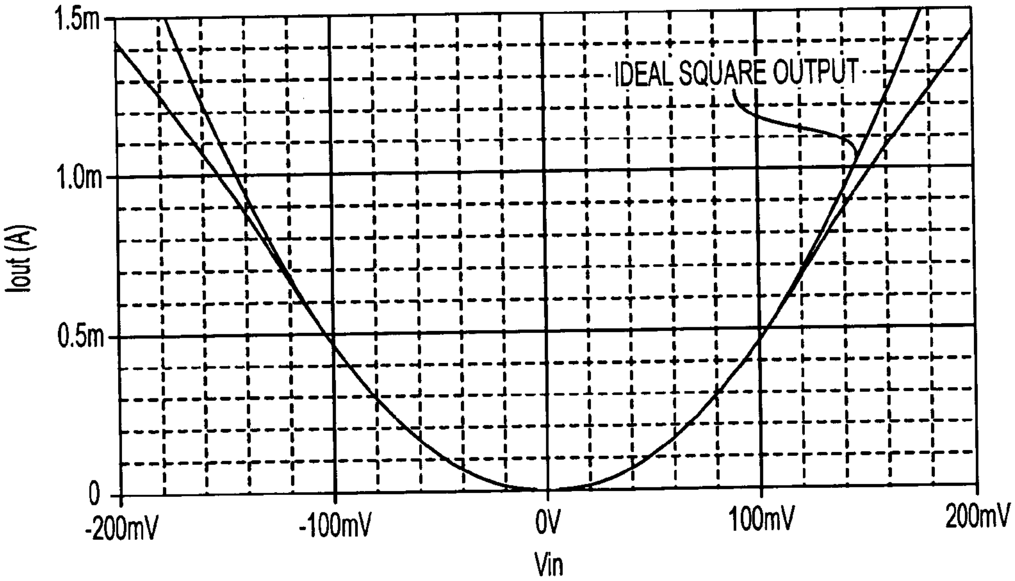

FIGS. 5(*a*) and 5(*b*) show how the current output of the multiplier described herein conforms to ideal squaring law performance. In FIG. 5(*a*), shows deviation of the output current from what is an ideal squaring function, demonstrating a nearly perfect square within a particular range of input voltages (100 mv. in this example). FIG. 5(*b*) shows the actual output current as a function of input voltage, in relation to the same example. In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A squaring cell, comprising:

a first circuit responsive to an input voltage to produce a corresponding current; and a second circuit responsive to the current produced by the first circuit and to the input voltage to produce an output current that corresponds to the square of the input voltage.

2. A squaring cell as recited in claim 1, in which the second circuit comprises an absolute value modulator circuit.

3. A squaring cell as recited in claim 1, in which the first circuit comprises an absolute value voltage-to-current converter.

4. A squaring cell as recited in claim 1, in which the first circuit comprises a linear voltage-to-current converter.

5. A squaring cell as recited in claim 3, in which the second circuit comprises first and second bipolar transistors having collector electrodes thereof connected to an output current node, base electrodes thereof coupled to first and second input nodes to receive the input voltage, and emitter electrodes thereof coupled to first and second current input nodes, respectively.

6. A squaring cell as recited in claim 5, further including third and fourth bipolar transistors coupled respectively between the first and second voltage input nodes and the first and second transistor emitter electrodes.

7. A squaring cell as recited in claim 6, in which the area ratios of the third and fourth transistors to the first and second transistors are respectively A:1, where A>1.

8. A squaring cell as recited in claim 6, in which the collector electrodes of the third and fourth transistors are connected to receive a reference voltage.

9. A squaring cell as recited in claim 6, in which base electrodes of the third and fourth transistors are coupled to the voltage input nodes, respectively, and emitter electrodes of the third and fourth transistors are coupled to the emitter electrodes of the first and second transistors.

10. A squaring cell as recited in claim 3, in which the first circuit comprises a fifth transistor coupled between the first transistor emitter electrode and a first constant current source, and sixth transistor coupled between the second transistor emitter electrode and second constant current source, and having base electrodes coupled, respectively, to the first and second input voltage nodes.

11. A squaring cell as recited in claim 10, further including seventh and eighth transistors having emitter electrodes thereof coupled to fifth and sixth transistor emitter electrodes, respectively, and having base electrodes coupled respectively to receive the input voltage from the input voltage nodes.

12. A squaring cell as recited in claim 10, wherein collector electrodes of the seventh and eighth transistors are connected to receive the reference voltage.

13. A squaring cell as recited in claim 11, further including a first emitter follower transistor coupled between the first input voltage node and the fifth and eighth transistors, and a second emitter follower transistor coupled between the second input voltage node and the sixth and seventh transistors.

14. A squaring cell as recited in claim 13, including third and fourth constant current sources coupled respectively to the emitter electrodes of the first and second emitter follower transistors.

15. A squaring cell as recited in claim 4, in which the second circuit comprises first and second bipolar transistors having collector electrodes thereof connected to an output current node, base electrodes thereof coupled respectively to first and second input nodes to receive the input voltage, and emitter electrodes thereof coupled to first and second current input nodes, respectively.

16. A squaring cell as recited in claim 15, further including third and fourth bipolar transistors coupled respectively between the first and second voltage input nodes and the first and second transistor emitter electrodes.

17. A squaring cell as recited in claim 16, in which the area ratios of the third and fourth transistors to the first and second transistors are respectively A:1, where A>1.

18. A squaring cell as recited in claim 15, in which collector electrodes of the third and fourth transistors are connected to receive a reference voltage.

19. A squaring cell as recited in claim 15, in which the first circuit comprises a fifth bipolar transistor coupled between the first transistor emitter electrode and a first constant current source, and a sixth bipolar transistor coupled between the second transistor emitter electrode and a second constant current source, and having base electrodes coupled, respectively, to the first and second input voltage nodes.

20. A squaring cell as recited in claim 19, wherein the first and second constant current sources provide currents proportional to absolute temperature.

21. A squaring cell as recited in claim 19, further including eighth and ninth transistors having emitter electrodes thereof coupled to fifth and sixth transistor emitter electrodes, respectively, and having base electrodes coupled respectively to the input voltage nodes.

22. A squaring cell as recited in claim 21, wherein collector electrodes of the seventh and eighth transistors are connected respectively to the fourth and third transistor emitter electrodes.

23. A squaring cell as recited in claim 22, wherein collector electrodes of the fifth and eighth transistor are interconnected, and collector electrodes of the sixth and seventh transistors are interconnected.

24. A squaring cell as recited in claim 22, further including a first emitter follower transistor coupled between the first input voltage node and the fifth and eighth transistors, and a second emitter follower transistor coupled between the second input voltage node and the sixth and seventh transistors.

25. A squaring cell as recited in claim 24, including third and fourth constant current sources coupled respectively to the emitter electrodes of the first and second emitter follower transistors.

26. A squaring cell as recited in claim 24, further including a third emitter follower transistor coupled between the first input voltage node and the first and fourth transistors, and a second emitter follower transistor coupled between the second input voltage node and the second transistor.

27. A squaring cell as recited in claim 26, including fourth and fifth constant current sources coupled respectively to the emitter electrodes of the third and fourth emitter follower transistors.

28. A squaring cell as recited in claim 27, including first and second shaping resistors coupled respectively to the emitter electrodes of the third and fourth emitter follower transistors.

29. A squaring cell as recited in claim 27, including third and fourth shaping resistors coupled respectively to he emitter electrodes of the fifth and sixth transistors.

30. A squaring cell as recited in claim 29, in which the emitter electrode of the seventh transistor is connected to a node between the third shaping resistor and the first constant current source, and the emitter electrode of the eighth transistor is connected to a node between the fourth shaping resistor and the second constant current source.

31. A squaring cell as recited in claim 27, including fifth and sixth shaping resistors coupled respectively to the emitter electrodes of the first and fourth transistors.

32. A squaring cell, comprising:

an absolute value voltage and current modulator having voltage and current input nodes, and a current output node; and a voltage-to-current converter having voltage input nodes and a current output node, in which the voltage input nodes of the modulator and converter are connected to receive an input voltage; and in which the input current nodes of the modulator are connected to receive the output current of the converter.

33. A squaring cell as recited in claim 32, wherein the converter is an absolute voltage-to-current converter.

34. A squaring cell as recited in claim 32, wherein the converter is a linear voltage-to-current converter.

* * * * *